(12) United States Patent
Kelling

(10) Patent No.: US 10,483,814 B2
(45) Date of Patent: Nov. 19, 2019

(54) SYNCHRONOUS-GENERATOR POLE STACK

(71) Applicant: Wobben Properties GmbH, Aurich (DE)

(72) Inventor: Ralf Kelling, Eversmeer (DE)

(73) Assignee: Wobben Properties GmbH, Aurich (DE)

( * ) Notice: Subject to any disclaimer, the term of this patent is extended or adjusted under 35 U.S.C. 154(b) by 422 days.

(21) Appl. No.: 14/782,265

(22) PCT Filed: Apr. 3, 2014

(86) PCT No.: PCT/EP2014/056741
§ 371 (c)(1),
(2) Date: Oct. 2, 2015

(87) PCT Pub. No.: WO2014/166817
PCT Pub. Date: Oct. 16, 2014

(65) Prior Publication Data
US 2016/0036273 A1    Feb. 4, 2016

(30) Foreign Application Priority Data
Apr. 8, 2013  (DE) .......................... 10 2013 206 121

(51) Int. Cl.
*H02K 1/08*  (2006.01)
*H02K 1/24*  (2006.01)
*F03D 9/25*  (2016.01)
*H02K 7/18*  (2006.01)

(52) U.S. Cl.
CPC .................. *H02K 1/24* (2013.01); *F03D 9/25* (2016.05); *H02K 1/08* (2013.01); *H02K 7/1838* (2013.01); *H02K 2201/06* (2013.01); *Y02E 10/725* (2013.01)

(58) Field of Classification Search
CPC .................................. H02K 1/06; H02K 1/22
USPC ........... 310/162, 216.011, 216.012, 216.072, 310/216.093, 216.096
See application file for complete search history.

(56) References Cited

U.S. PATENT DOCUMENTS

| 4,616,151 | A  |   | 10/1986 | Pryjmak |
|-----------|----|---|---------|---------|
| 6,803,671 | B1 | * | 10/2004 | Wobben ................. H02K 1/185 290/55 |
| 6,864,611 | B1 |   | 3/2005  | Wobben |
| 6,873,077 | B2 |   | 3/2005  | Jurisch |

(Continued)

FOREIGN PATENT DOCUMENTS

| CN | 1518789 A | 8/2004 |
|----|-----------|--------|
| CN | 2671206 Y | 1/2005 |

(Continued)

OTHER PUBLICATIONS

Decision on Grant, dated Apr. 10, 2018, for corresponding Japanese Application No. 2016-506855, 6 pages. (with English Translation).

*Primary Examiner* — Burton S Mullins
(74) *Attorney, Agent, or Firm* — Seed IP Law Group LLP

(57) ABSTRACT

A synchronous generator rotor pole pack having a plurality of pole pack laminations which are offset with respect to one another, a pole shank, a pole head with at least three pole head sections is provided. A front edge of each of the at least three pole head sections is arranged at an angle with respect to the pole shank.

7 Claims, 3 Drawing Sheets

(56) References Cited

U.S. PATENT DOCUMENTS

| | | | |
|---|---|---|---|
| 7,196,445 | B2 | 3/2007 | Yamaguchi et al. |
| 7,259,490 | B2 | 8/2007 | Wobben |
| 7,825,552 | B2 | 11/2010 | Husband et al. |
| 8,274,182 | B2 | 9/2012 | Nakayama et al. |
| 8,421,294 | B2 | 4/2013 | Yamaguchi et al. |
| 2004/0100158 | A1* | 5/2004 | Maybury ............ H02K 1/24 310/216.091 |
| 2005/0017589 | A1* | 1/2005 | Ionel ............ H02K 1/2733 310/156.47 |
| 2006/0163969 | A1 | 7/2006 | Nemoto et al. |
| 2009/0026872 | A1 | 1/2009 | Tomohara et al. |
| 2009/0026873 | A1* | 1/2009 | Matsuo ............ H02K 1/148 310/216.009 |
| 2010/0052466 | A1* | 3/2010 | Vollmer ............ H02K 1/278 310/216.012 |
| 2010/0201210 | A1 | 8/2010 | Nakayama et al. |
| 2012/0080973 | A1 | 4/2012 | Furukawa et al. |
| 2014/0132108 | A1 | 5/2014 | Jepsen et al. |
| 2018/0097411 | A1 | 4/2018 | Giengiel |

FOREIGN PATENT DOCUMENTS

| | | | |
|---|---|---|---|
| CN | 100403625 | C | 7/2008 |
| CN | 100530894 | C | 8/2009 |
| CN | 100576700 | C | 12/2009 |
| CN | 101816118 | A | 8/2010 |
| CN | 101911444 | A | 12/2010 |
| CN | 202940646 | U | 5/2013 |
| DE | 32 45 033 | A1 | 6/1983 |
| DE | 4114989 | A1 | 11/1992 |
| DE | 197 29 034 | A1 | 1/1999 |
| DE | 199 223 925 | A1 | 12/2000 |
| DE | 10348401 | A1 | 5/2004 |
| DE | 10349076 | A1 | 5/2005 |
| DE | 112007000201 | T5 | 11/2008 |
| DE | 11 2007 000 219 | T5 | 12/2008 |
| DE | 10 2008 029 377 | A1 | 12/2009 |
| DE | 112008002686 | T5 | 8/2010 |
| DE | 10 2009 019 555 | A1 | 11/2010 |
| DE | 10 2011 077 217 | A1 | 12/2012 |
| DE | 102013206121 | A1 | 10/2014 |
| EP | 0473534 | A2 | 3/1992 |
| EP | 0786851 | A1 | 7/1997 |
| EP | 1275192 | B1 | 5/2007 |
| EP | 2234250 | A1 | 9/2010 |
| GB | 2361362 | A | 10/2001 |
| GB | 2 389 241 | A | 12/2003 |
| JP | S5052415 | U | 5/1975 |
| JP | 07322537 | A | * 12/1995 |
| JP | 8298735 | A | 11/1996 |
| JP | 2003501994 | A | 1/2003 |
| JP | 2004-260951 | | * 9/2004 ............ H02K 1/27 |
| JP | 2004-260951 | A | 9/2004 |
| JP | 2005506819 | A | 3/2005 |
| JP | 2007-60800 | A | 3/2007 |
| JP | 2010-115054 | A | 5/2010 |
| JP | 201229405 | A | 2/2012 |
| JP | 2012100514 | A | 5/2012 |
| JP | 2014516241 | A | 7/2014 |
| SU | 826502 | A1 | 4/1981 |
| TW | 201310863 | A1 | 3/2013 |
| WO | 0074210 | A1 | 12/2000 |
| WO | 0180401 | A1 | 10/2001 |
| WO | 2012107109 | A1 | 8/2012 |
| WO | 2012168238 | A2 | 12/2012 |

* cited by examiner

SYNCHRONOUS-GENERATOR POLE STACK

BACKGROUND

Technical Field

The present invention relates to a synchronous generator pole pack and to a synchronous generator.

Description of the Related Art

DE 197 29 034 A1 discloses a synchronous generator for a wind power plant. The synchronous generator has a generator stator and a movable generator armature or generator rotor. A plurality of pole packs are provided on the generator armature. The pole packs have a pole head with edge sections which are arranged at an angle with respect to one another. The pole head is of an arrow-shaped configuration in plan view.

DE 199 23 925 A1 discloses a synchronous generator having a generator stator and a generator armature or generator rotor. A plurality of poles or pole packs are provided on the generator rotor, the pole heads of the pole packs being of an arrow-shaped configuration.

DE 11 2007 000 219 T5 discloses a pole pack for the rotor of a synchronous motor. The pole pack is of an arrow-shaped or oblique configuration in plan view. In other words, the front edge in the running direction or the front end in the running direction of the pole pack is arranged obliquely. The spacing of the front edge from a pole shank is therefore not constant.

GB 2 389 241 discloses a pole pack for a synchronous generator, a plurality of pole packs being provided on the generator armature of the synchronous generator. The pole head of the pole pack is of an arrow-shaped configuration in plan view.

In the German application which establishes priority, the German Patent and Trade Mark Office searched the following documents: DE 199 23 925 A1, U.S. Pat. No. 4,616,151, DE 10 2009 019 555 A1 and DE 32 45 033 C2.

BRIEF SUMMARY

One or more embodiments of the present invention provide a synchronous generator which makes it possible to reduce the noise emission in the synchronous generator.

One embodiment is directed to a synchronous generator pole pack according to Claim 1.

A synchronous generator rotor pole pack having a plurality of pole pack laminations which are offset with respect to one another, a pole shank, and a pole head with at least three pole head sections is provided. A front edge of each of the at least three pole head sections is arranged at an angle with respect to the pole shank.

According to one aspect of the present invention, the pole head has four pole head sections.

According to a further aspect of the present invention, the length of the front edge of the four pole head sections is identical.

According to a further aspect of the present invention, the length of the front edge of the first and fourth section is identical and the length of the second and third section is identical. The length of the first and fourth section is not identical with the length of the second and third section.

One embodiment of the invention relates to a synchronous generator having a plurality of synchronous generator rotor pole packs.

Furthermore, another embodiment of the invention relates to a wind energy plant having a synchronous generator which has a plurality of pole packs.

According to a further aspect of the present invention, the pole head can have a groove parallel to the pole shank.

One or more embodiments of the invention relates to a concept of providing a pole pack with a pole head for a synchronous generator rotor, the pole head no longer being provided in a V shape or arrow shape, but rather, for example, as a double V or as a double V with sections of unequal length.

BRIEF DESCRIPTION OF THE SEVERAL VIEWS OF THE DRAWINGS

Advantages and exemplary embodiments of the invention will be described in further detail in the following text with reference to the drawings, in which.

DETAILED DESCRIPTION

Figure 1:
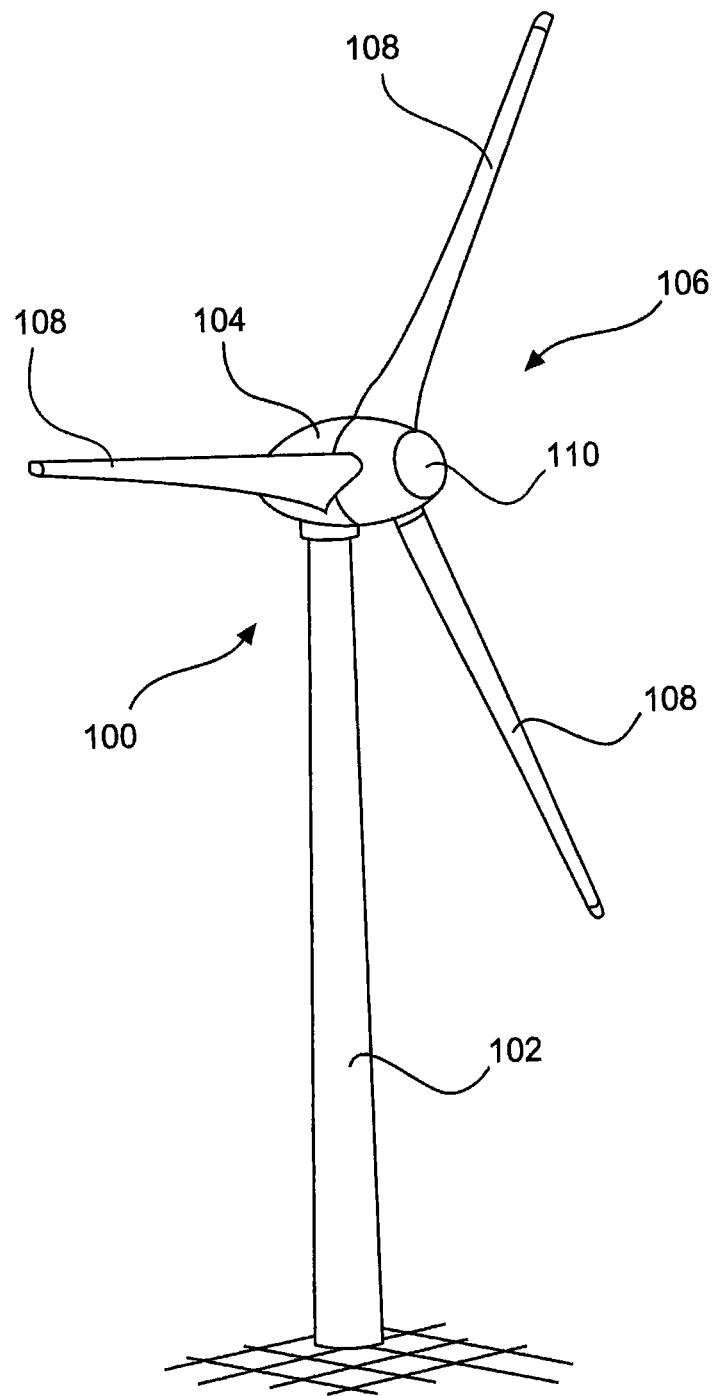
FIG. 1 shows a diagrammatic illustration of a wind energy plant according to one embodiment of the invention.

FIG. 1 shows a diagrammatic illustration of a wind energy plant according to one embodiment of the invention. The wind energy plant 100 has a tower 102 and a nacelle 104. On the nacelle 104, a rotor 106 with three rotor blades 108 and a spinner 110 is provided. During operation, the rotor 106 is set in a rotational movement by the wind and, as a result, an electric generator 200 is driven inside the nacelle 104. The electric generator 200 (FIG. 2) has a stationary generator stator and a rotating generator rotor. The rotor 106 is connected directly or indirectly (via a gear mechanism) to the generator rotor.

The angle of attack or pitch of the rotor blades 108 can be changed by way of pitch motors at the rotor blade roots of the respective rotor blades 108.

Figure 2:
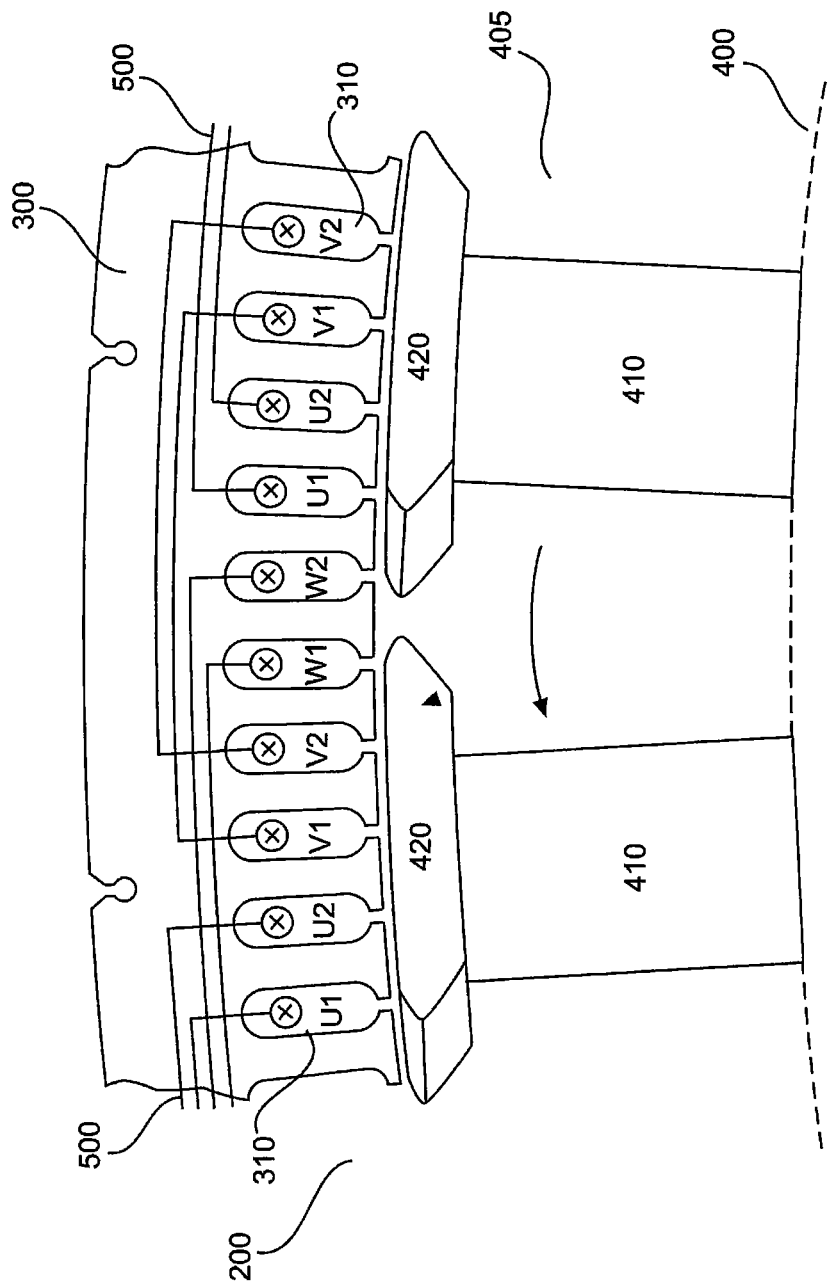
FIG. 2 shows a diagrammatic sectional view of a synchronous generator, and FIGS. 3A-3E in each case show a diagrammatic plan view of pole packs of a synchronous generator according to various embodiments of the invention.

FIG. 2 shows a diagrammatic sectional view of a synchronous generator. FIG. 2 shows a portion of the generator 200. The generator has a generator stator 300 and a generator armature or generator rotor 400. A plurality of grooves 310 which receive a stator winding 500 are provided in the generator stator 300. The generator rotor or generator armature 400 has a plurality of pole shoes 405. A pole shoe 405 has a pole shank 410 and a pole head 420. The pole shoes 405 usually consist of a plurality of pole pack segments, for example in the form of laminations (pole pack laminations, one of which is illustrated as pole shoe 405 in FIG. 2).

Figure 3A:
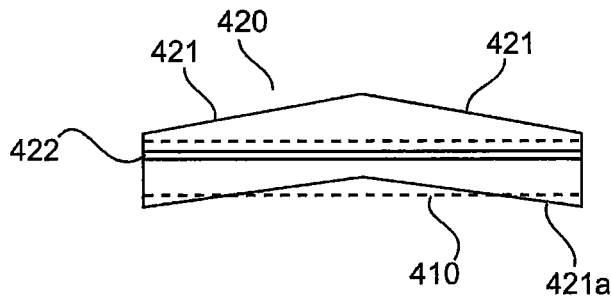

FIGS. 3A-3E in each case shows a diagrammatic plan view of a pole pack of a synchronous generator according to various embodiments of the invention, in particular of a synchronous generator rotor. FIG. 3A shows a diagrammatic plan view of a pole pack or pole shoe with a pole shank 410 and a pole head 420. The pole head 420 has two front edges 421 which are arranged obliquely with respect to one another. The front edge 421 is at a first angle with respect to the pole shank 410. As shown in FIG. 3A, the front edge 421 extends beyond the pole shank 410. Furthermore, the pole head can optionally have a groove 422. The groove 422 is straight and is optionally arranged parallel to the pole shank 410.

FIG. 3A shows one embodiment, the pole head having an arrow shape and, in addition, a groove. In this way, the spot frequency of the generator can be increased.

The pole pack of the synchronous generator rotor consists of a plurality of pole pack segments or laminations, the depth of the packs of the pole head 420 being identical, with the result that rear edges 421 a are likewise tapered obliquely. The segments of the pole head 420 are arranged offset with respect to the adjacent segment, whereas the segments for the pole shank are not arranged offset with respect to one another.

Optionally, a groove 422 can be provided substantially parallel to the pole shank 410.

Figure 3B:
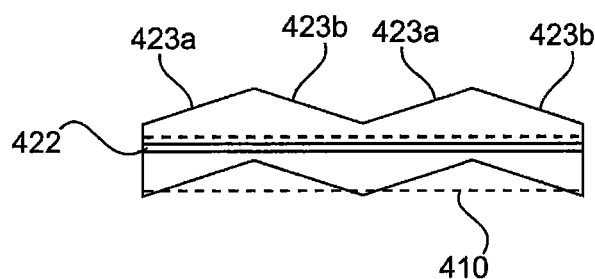

FIG. 3B shows a pole head having a double arrow shape or a double V shape. As a result of the double arrow shape, a change in the magnetic force guidance during the groove passage can be made possible. Optionally, in addition, a groove 422 can be provided, with the result that a change in the magnetic force guidance during the groove passage and an increase in the spot frequency are possible.

FIG. 3B shows a pole pack with a pole shank 410 and four pole pack sections 423a to 423b, the first and third section 423a and the second and fourth section 423b being of substantially identical configuration and being at an identical angle with respect to the pole shank. As in the embodiment from FIG. 3A, the pole pack segments in each case have the same depth, with the result that the configuration of the four front edges of the pole pack segments corresponds to the configuration of the four rear edges. FIG. 3B therefore shows a double V or double arrow shape of the pole head 420.

Figure 3C:
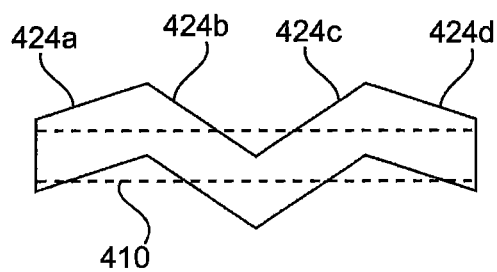

FIG. 3C shows a pole pack having a first, second, third and fourth pole pack section 424a to 424d. Whereas the first and second pole pack sections 423a, 423b according to FIG. 3B have the same length, the first and second pole pack segments 424a, 424b have different lengths. Furthermore, the length of the third pole pack section 424c corresponds to the length of the second pole pack section 424b. The length of the fourth pole pack section 424d corresponds to the length of the first pole pack section 424a.

FIG. 3C shows a double V shape of unequal length. In this way, a change in the magnetic force guidance during the groove passage and a change in the spot frequency are made possible.

Optionally, a groove 422 can be provided parallel to the pole shank 410.

Figure 3D:
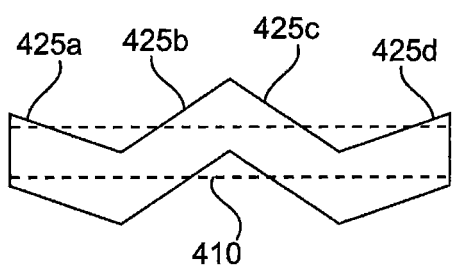

FIG. 3D shows a pole pack having four pole pack sections 425a to 425d. The configuration of the pole pack according to FIG. 3D is mirror-symmetrical with respect to the configuration of the pole pack from FIG. 3C.

FIG. 3D shows a pole head from FIG. 3C which is rotated by 180°. Optionally, the pole head can have a groove. As a result of the configuration of the pole head from FIGS. 3D and 3C, a change in the magnetic force guidance during the groove passage and a change in the spot frequency can be made possible.

Figure 3E:
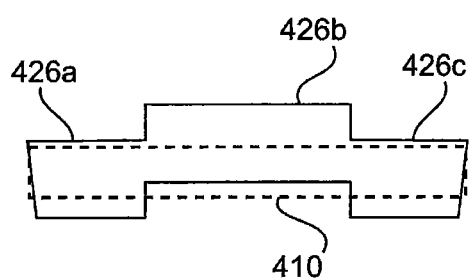

FIG. 3E shows a stepped pole head. In this way, a multiplication of the spot frequency as a function of the number of the steps can be made possible. FIG. 3E therefore shows a pole pack consisting of three segments 426a, 426b and 426c. The first and third segment 426a, 426c correspond to one another. A step is provided in each case between the first and second and the second and third segment.

By way of the pole packs, the synchronous generators and, in particular, synchronous generator rotors can also be realized which have a great axial width. By way of the provision of a pole pack with two tips rather than merely one tip, it is possible that the front edges of the pole pack have a greater pitch than in the case of merely one tip. The positive effect can be improved, for example, by the provision of a groove 422 in the pole head. The cogging torque of the synchronous generator can be improved as a result. According to the embodiment of FIGS. 3B, 3C and 3D, force guidance can be distributed to two points.

The synchronous generator is a synchronous generator for a wind energy plant. The synchronous generator is configured as a slowly rotating ring generator. The maximum output of the synchronous generator is at least 1 MW. The diameter of the synchronous generator is at least 4 meters. The synchronous generator is preferably configured as a separately excited synchronous generator. The synchronous generator is of internal rotor configuration (that is to say, the rotor of the generator is on the inside and is surrounded at least partially by the stator).

The invention claimed is:

1. A synchronous generator rotor pole pack, comprising:
a plurality of pole shoes each comprising a plurality of pole pack segments, wherein each pole pack segment comprises a pole shank portion and a pole head portion, wherein the pole shank portions of the plurality of pole pack segments form a pole shank, wherein the pole head portions of the plurality of pole pack segments form a pole head having at least three pole head sections, wherein a front edge of each of the at least three pole head sections is arranged at an angle with respect to the pole shank, wherein a depth of the pole head portions of the plurality of pole pack segments are identical, wherein the pole head portions of the plurality of pole pack segments are offset with respect to adjacent pole head portions, wherein the segment in an area of the pole shank are not arranged offset with respect to each other, and wherein the pole shank is arranged as a straight continuous portion.

2. The synchronous generator rotor pole pack according to claim 1, wherein the pole head has four pole head sections.

3. The synchronous generator rotor pole pack according to claim 2, wherein a length of the front edges of the four pole head sections are identical.

4. The synchronous generator rotor pole pack according to claim 2, wherein:
a first length of the front edge of the first and fourth pole head sections are identical, and
a second length of the second and third pole head sections are identical, the first length of the first and fourth pole head section not being identical with the second length of the second and third pole head sections.

5. The synchronous generator rotor pole pack according to claim 1, wherein the pole head has a groove that is parallel to the pole shank.

6. A synchronous generator comprising:
a generator rotor having a plurality of synchronous generator rotor pole packs according to claim 1.

7. A wind power plant, comprising:
a synchronous generator having a plurality of pole packs, each pole pack including a plurality of pole shoes each comprising a plurality of pole pack segments, wherein each pole pack segment comprises a pole shank portion and a pole head portion, wherein the pole shank portions of the plurality of pole pack segments form a pole shank, wherein the pole head portions of the plurality of pole pack segments form a pole head having at least three pole head sections, wherein a front edge of each of the at least three pole head sections is arranged at an angle with respect to the pole shank, wherein a depth of the pole head portions of the plurality of pole pack segments are identical, wherein the pole head portions of the plurality of pole pack segments are offset with respect to adjacent pole head portions, wherein the segment in an area of the pole shank are not arranged offset with respect to each other, and wherein the pole shank is arranged as a straight continuous portion.

* * * * *